(12) United States Patent
Dima et al.

(10) Patent No.: US 11,483,972 B2
(45) Date of Patent: Nov. 1, 2022

(54) SYSTEM FOR CONTROLLING AN OPERATIVE PARAMETER OF A HARVESTING HEADER

(71) Applicant: DEERE & COMPANY, Moline, IL (US)

(72) Inventors: Cristian Dima, St. Ingbert / Rohrbach (DE); Mahesh Bothe, Pune (IN); Narendar Reddy Karedla, Pune (IN); Paul Readel, Urbandale, IA (US)

(73) Assignee: Deere & Company, Moline, IL (US)

( * ) Notice: Subject to any disclaimer, the term of this patent is extended or adjusted under 35 U.S.C. 154(b) by 722 days.

(21) Appl. No.: 16/378,813

(22) Filed: Apr. 9, 2019

(65) Prior Publication Data

US 2019/0307070 A1    Oct. 10, 2019

(30) Foreign Application Priority Data

Apr. 9, 2018  (IN) .............................. 201821013464

(51) Int. Cl.
| | | |
|---|---|---|
| *A01D 41/14* | (2006.01) | |
| *A01B 63/00* | (2006.01) | |
| *A01D 57/04* | (2006.01) | |

(52) U.S. Cl.
CPC .......... *A01D 41/141* (2013.01); *A01B 63/008* (2013.01); *A01D 57/04* (2013.01)

(58) Field of Classification Search
CPC .... A01B 63/008; A01D 34/006; A01D 57/04; A01D 41/141
See application file for complete search history.

(56) References Cited

U.S. PATENT DOCUMENTS

| | | | | |
|---|---|---|---|---|
| 5,911,669 A | * | 6/1999 | Stentz ................. | A01B 69/001 56/10.2 F |
| 6,389,785 B1 | * | 5/2002 | Diekhans ............. | A01B 69/001 56/10.2 F |

(Continued)

FOREIGN PATENT DOCUMENTS

| | | |
|---|---|---|
| CN | 102239770 A | 11/2011 |
| CN | 107409635 A | 12/2017 |

(Continued)

OTHER PUBLICATIONS

Russian Search Report issued in counterpart application No. 2019106511 dated May 25, 2020 (02 pages).

(Continued)

*Primary Examiner* — Adam J Behrens (57) ABSTRACT

A system for controlling an operative parameter of a harvesting header of an agricultural harvesting machine comprises a first sensing arrangement for sensing a property of a field in front of the header in a contact-less manner, a second sensing arrangement for providing a signal suited to derive a value of an adjustable work parameter of the header, an actuator for adjusting the work parameter, and a control unit for determining a control signal for the actuator based on the signal from the first sensing arrangement and on the signal from the second sensing arrangement. The second sensing arrangement is arranged to detect the position of a reference point, which indicates the work parameter, in a contact-less manner, and that the first sensing arrangement and the second sensing arrangement are relatively fixed.

11 Claims, 2 Drawing Sheets

(56) References Cited

U.S. PATENT DOCUMENTS

| | | | |
|---|---|---|---|
| 6,615,570 B2* | 9/2003 | Beck | A01D 41/141 |
| | | | 56/10.2 E |
| 6,826,894 B2* | 12/2004 | Thiemann | A01D 41/141 |
| | | | 56/10.2 E |
| 9,585,309 B2* | 3/2017 | Posselius | A01D 41/141 |
| 9,807,933 B2* | 11/2017 | Boyd | A01D 41/127 |
| 10,757,859 B2* | 9/2020 | Dima | A01D 34/04 |
| 2015/0216123 A1* | 8/2015 | Digman | A01D 41/141 |
| | | | 56/10.2 R |
| 2015/0334919 A1 | 11/2015 | Schleicher | |
| 2016/0106038 A1* | 4/2016 | Boyd | A01D 41/127 |
| | | | 56/10.4 |
| 2017/0013777 A1* | 1/2017 | Posselius | A01D 41/141 |
| 2017/0118915 A1* | 5/2017 | Middelberg | A01D 69/03 |
| 2018/0332768 A1* | 11/2018 | Isaac | A01D 75/287 |
| 2019/0110394 A1* | 4/2019 | VanNahmen | A01D 34/006 |
| 2021/0137006 A1* | 5/2021 | Shearer | A01D 57/02 |

FOREIGN PATENT DOCUMENTS

| | | | | |
|---|---|---|---|---|
| CN | 107426965 A | 12/2017 | | |
| DE | 4411646 A1 | 11/1995 | | |
| DE | 102011017621 A1 * | 10/2012 | ........... | A01D 41/141 |
| DE | 102014209371 A1 | 11/2014 | | |
| DE | 102016202627 A1 * | 8/2017 | ........... | A01D 41/127 |
| DE | 102016202627 A1 | 8/2017 | | |
| DE | 102016202628 A1 | 8/2017 | | |
| DE | 102017129193 A1 * | 6/2019 | ......... | A01D 41/1273 |
| EP | 0845198 A1 | 6/1998 | | |
| EP | 0970595 A1 | 1/2000 | | |
| EP | 970595 B2 | 4/2007 | | |
| EP | 2143316 A1 | 1/2010 | | |
| EP | 2517549 A1 | 10/2012 | | |
| EP | 2681984 A1 | 1/2014 | | |
| EP | 2803257 A1 | 11/2014 | | |
| EP | 2959318 A1 | 12/2015 | | |
| EP | 3430881 A1 | 1/2019 | | |
| EP | 3494771 A1 | 6/2019 | | |
| GB | 2173309 A | 10/1986 | | |
| RU | 2403698 C2 | 11/2010 | | |
| WO | 03049532 A1 | 6/2003 | | |
| WO | 2008088916 A2 | 7/2008 | | |

OTHER PUBLICATIONS

European Search Report issued in counterpart application No. 19167861.4 dated Sep. 5, 2019. (8 pages).

U.S. Appl. No. 62/535,043, Dima, et al., filed Jul. 20, 2017, 15 pages.

Chinese Office Action issued in Chinese Application No. 201910171200.6 (dated Mar. 10, 2022) (07 pages).

* cited by examiner

SYSTEM FOR CONTROLLING AN OPERATIVE PARAMETER OF A HARVESTING HEADER

RELATED APPLICATIONS

This claims priority to Indian Application No. 201821013464, titled A SYSTEM FOR CONTROLLING AN OPERATIVE PARAMETER OF A HARVESTING HEADER, filed Apr. 9, 2018, which is hereby incorporated by reference in its entirety.

FIELD OF THE DISCLOSURE

The present disclosure relates generally to agricultural harvesting machines. More particularly it relates to control of work parameters of a header of the harvesting machine.

BACKGROUND OF THE DISCLOSURE

Agricultural harvesting machines are designed to harvest crops. They have headers designed to cut or collect crops from the ground, which are subsequently processed in the body of the harvesting machine, or directly deposited on the ground. In case of a combine, the harvesting machine threshes the crops, separates the grain from material other than grain (MOG), cleans the grain, and stores the grain in a grain tank. Eventually, they transfer the grain from the grain tank to an accompanying vehicle such as a grain cart or grain wagon. In case of a forage harvester, the crop is cut, accelerated and blown into a container of a transport vehicle, and in case of a windrower, the crop is cut and deposited on a field in a swath.

While numerous functions of the harvesting machine have already been automated in the past, like length-of-cut determination and kernel processor adjustment in a forage harvester or adjustment of a threshing and cleaning arrangement in a combine, automation of header functions is still under development. Actually, the operator of a harvesting machine thus needs to concentrate on the field in front of the machine and adapt a number of work parameters of the header manually, what is a cumbersome task.

A typical header of a combine for harvesting small grain like wheat or barley is a so-called platform, which comprises a knife bar, a reel and a transverse conveyor. The knife bar cuts the stalks of the crop from the roots remaining in the ground, and the transverse conveyor, which can be an auger or a belt conveyor, feeds the crop transversely to the feederhouse which on its end feeds it into the interior of the combine harvester for threshing and further processing. The reel is located above the knife bar and rotates to engage with fingers into the crop to feed the crop rearwardly such that it can be cut by the knife bar. The cut crop is conveyed to the rear by at least one of the reel fingers and subsequently harvested crop until it is engaged by the transverse conveyor. Such a platform header can also be used on a forage harvester for providing silage of entire grain plants and on a windrower.

A number of automations of work parameters of platforms, which had to be controlled in the past manually by the harvesting machine operator, have been proposed. For example, the position of the header over ground and thus the cutting height can be controlled automatically based on sensors in a ground- or crop-contour following manner (U.S. Pat. No. 6,615,570 B2, DE 44 11 646 A1). A further work parameter of a cutting platform of a combine to be controlled is the reel position. It was proposed to sense the position of the top of the crop with an ultrasonic sensor (GB 2 173 309 A) or with a camera (EP 2 681 984 A1) or with a combined RADAR and LIDAR sensor (EP 2 517 549 A1) and to adjust the vertical reel position (and in EP 2 517 549 A1, also the reel speed and horizontal position) accordingly.

The automation mentioned in the preceding paragraph can be classified as an open loop system, in which a nominal value of a work parameter of the header is determined by a first sensor and a control unit determines a nominal parameter for an actuator adapted to influence the work parameter and sends a control signal to the actuator. The control signal is determined based on the difference between the nominal parameter and a feedback value from a second sensor which directly or indirectly provides a signal for the actual work parameter. The control signal is determined in a manner to minimize the difference between the nominal parameter and the feedback value. Such systems (cf. U.S. Pat. No. 6,615,570 B2) require a feedback sensor on board of the header, for example to detect the height of the header over ground or the position of the reel with respect to the header and/or a feedback sensor on board of the harvesting machine, in order to detect the position of the part of the harvesting machine (in case of a combine, the feederhouse) holding the header with respect to the harvesting machine.

In order to provide a proper function of the automation, the control unit needs to know a relation between the signal of the second sensor and the work parameter. If the work parameter is for example the height of the header over ground and the second sensor detects the angle of the feederhouse with respect to the harvesting machine, the control unit needs to know the distance between the pivot support of the feederhouse and the header and the height of the pivot support over ground. Already this simple case reveals a number of possible errors, like changed tire sizes or mounting of a longer feederhouse. This gets even more problematic in case of determination of the position of the reel which is mounted longitudinally shiftable on reel arms that pivot around horizontal axes with respect to the header. In order to determine the horizontal and vertical reel position correctly, at least three sensor values thus need to be considered, plus numerous mechanical measurements of the header and the harvesting machine, causing a rather high number of possible error sources.

Another approach to automatically control functions of a header is to use a camera, generally mounted on the harvesting machine, and an image processing system to find and resolve crop feeding problems and congestions (EP 2 143 316 A1, DE 10 2016 202 628 A1). This automation can be classified as a closed loop system, since the sensor (camera) looks onto the work result of the header and the control signal sent by the control unit to the actuator is just based on the work result. This however has the disadvantage that possible problems, like straw stalks being carried over by a reel, cannot be avoided a priori, but only rectified once they are arising.

Finally, DE 10 2014 209 371 A1 describes a control device for an agricultural machine with a boom. A time-of-flight camera detects the position of reflective markings on the boom and controls the boom to move over the crop canopy or over ground, the height of which detected by the same camera, in a desired height. An application to headers is not apparent.

It is an object of this disclosure to provide an open loop automatic header control system avoiding or at least reducing the mentioned problems.

Other objects of the present disclosure will be apparent when the description of the disclosure is read in conjunction with the accompanying drawings. The accompanying drawings provided herein are merely illustrative and does not intend to limit the scope and ambit of the present disclosure.

SUMMARY OF THE DISCLOSURE

A system for controlling an operative parameter of a harvesting header of an agricultural harvesting machine comprises a first sensing arrangement for sensing a property of a field in front of the header in a contact-less manner, a second sensing arrangement for providing a signal suited to derive a value of an adjustable work parameter of the header, an actuator adapted to adjust the work parameter, and a control unit for determining a control signal for the actuator based on the signal from the first sensing arrangement and on the signal from the second sensing arrangement. The second sensing arrangement is arranged to detect the position of a reference point, which indicates the work parameter, in a contact-less manner. The first sensing arrangement and the second sensing arrangement are relatively fixed, i.e. not moving with respect to the other one during operation.

In other words, the open loop system as described above uses a contact-less second (feedback) sensing arrangement which is mounted together with, and thus not moving relative to, the first sensor. Both sensing arrangement thus sense and output their signals with respect to the same reference system to which they are mounted and hence the necessity of knowledge about possibly changing mechanical parameters and/or additional sensor values to derive the actual work parameter from the second sensor value is avoided, simplifying the control system and avoiding possible errors. Both sensing systems can thus sense and output their signals within a common reference system, i.e. use the same coordinate system for sensing and outputting their data.

The first sensing arrangement and the second sensing arrangement can be supported on the harvesting machine or on the header.

The control unit can operable to store and process signals of the first sensing arrangement and the second sensing arrangement in a local reference system of the header or of the harvesting machine for processing and determining the control signal for the actuator. It is also possible that the control unit converts them into an earth-referenced coordinate system, what has the advantage that these values can be augmented with sensor values that have been previously been gathered with another sensing system, for example on a drone.

The control unit can be adapted to determine a nominal work parameter for the actuator based upon the signal from the first sensing arrangement and to determine the control signal in a manner to minimize the difference between the nominal work parameter and an actual work parameter derived from the signal of the second sensing arrangement.

The work parameter adjusted by the actuator and sensed by the second sensing arrangement can be at least one of header height over ground, lateral header angle, forward header angle, vertical position of a reel and horizontal position of a reel.

The first sensing arrangement and the second sensing arrangement can comprise a jointly used sensor. In other embodiments, two distinct sensors can be used for the first sensing arrangement and the second sensing arrangement. In the latter case, the distance and relative orientation of the two sensing arrangements can be calibrated using known methods, for example by detecting a common feature in the field-of-view of both sensing arrangements.

The first and/or second sensing arrangement can comprise a camera with an image processing system or a laser or radar scanner or a PMD camera, preferably working in two dimensions, thus providing a 3d image.

An image processing system receiving an image signal from a camera or a scanner can be, to provide the function of the second sensing arrangement, adapted to sense markings mounted to an element of the header that is movable by the actuator and/or the movable element per se, which can be for example a part of the header which is movable by the actuator, like the reel moved by the actuator with respect to the header or a part of the header frame moved by the actuator with respect to the harvesting machine.

The property of the field detected by the first sensing arrangement can be at least one of the height of crop and the ground contour.

An agricultural harvesting machine can comprise a chassis, ground engaging means supporting the chassis on the ground, attachment means for adapting a harvesting platform on the chassis, and a system as described above.

The harvesting machine can be one of a combine, a forage harvester and a windrower.

Other features and aspects will become apparent by consideration of the detailed description and accompanying drawings.

BRIEF DESCRIPTION OF THE DRAWINGS

The present disclosure of the present disclosure will now be described with respect to the accompanying drawings wherein.

The embodiments herein and the various features and advantageous details thereof are explained with reference to the non-limiting embodiments in the following description. Descriptions of well-known components and processing techniques are omitted so as to not unnecessarily obscure the embodiments herein.

DETAILED DESCRIPTION OF THE DRAWINGS

Figure 1:
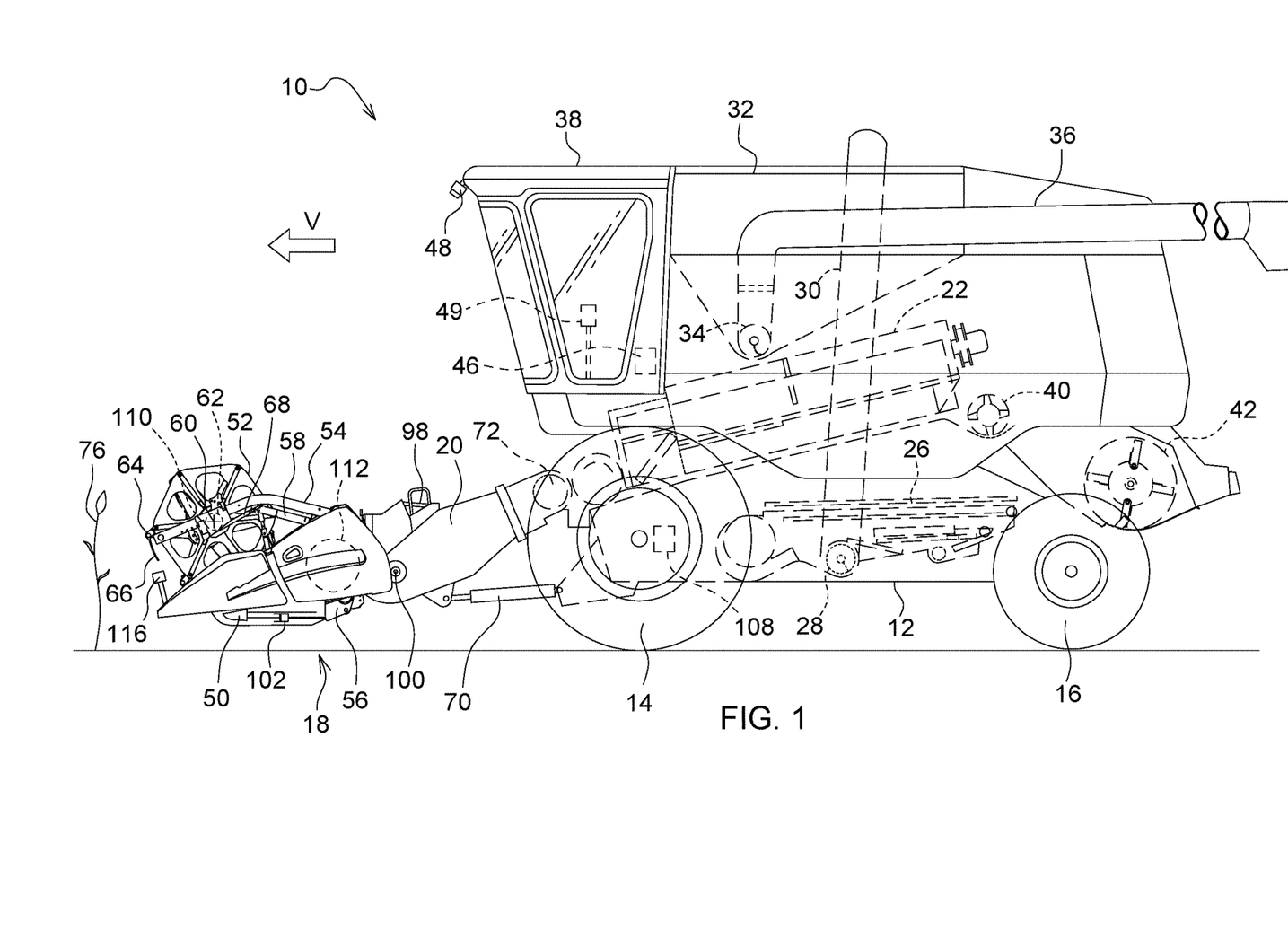
FIG. 1 is a schematic side view of an agricultural harvesting machine.
Figure 2:
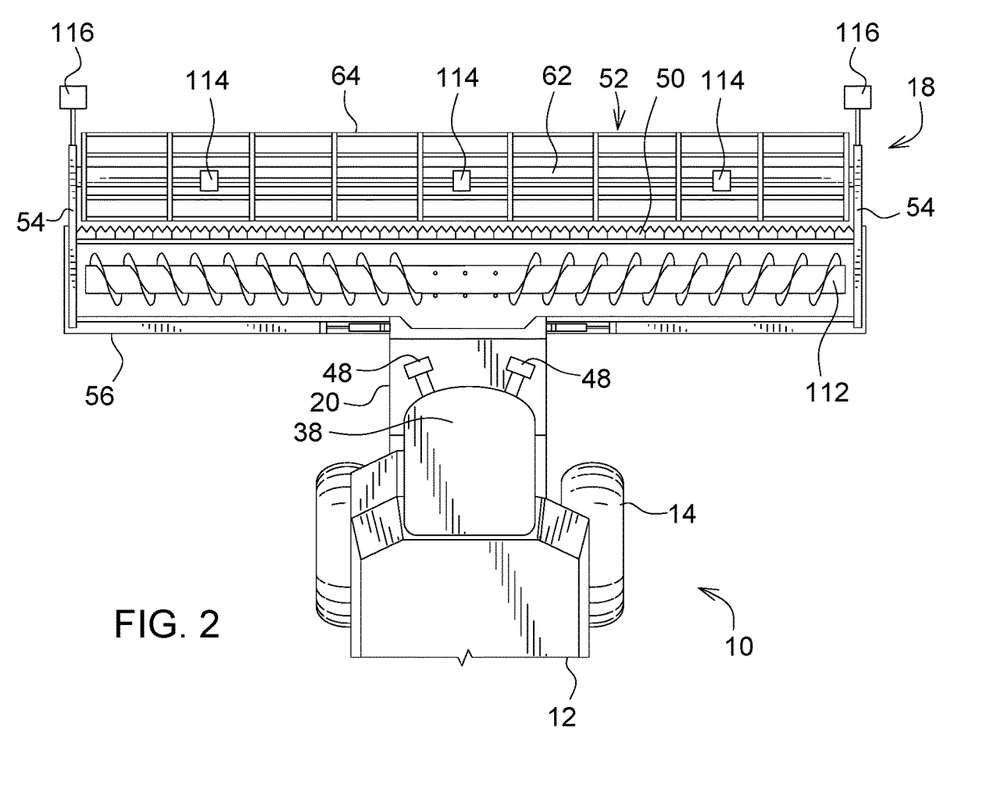
FIG. 2 is a top view of the harvesting machine of FIG. 1.

Harvesting Machine:

FIGS. 1 and 2 show a self-propelled harvesting machine 10 in the form of a combine, having a supporting chassis 12 that is supported on driven front wheels 14 and steerable rear wheels 16 on the ground and moved forward by the wheels 14, 16 (ground engaging apparatus). The wheels 14, 16 are set into a rotating motion by drive means (not shown) in order to move the harvesting machine 10 over a field to be harvested. In the following, direction references, like forward or rear, refer to the forward direction V of the harvesting machine 10, which is directed towards the left in FIG. 1.

On the forward end area of the harvesting machine 10, a harvesting header in the form of a harvesting platform 18 is releasably mounted, in order to harvest crop 76 in the form of grain or other threshable stalk fruit from the field and to convey it upwardly and rearwardly through a feederhouse assembly 20 to an axial threshing assembly 22 during the harvest operation. The mixture of grain and other material, which penetrates through threshing concaves and separation grates of the axial threshing assembly 22 reaches a cleaning device 26. Grain cleaned by the cleaning device 26 is conveyed by a grain auger 28 to a grain elevator 30 feeding it into a grain tank 32. The clean grain in the grain tank 32 can be unloaded by an unloading system comprising a transverse auger 34 and an unloader conveyor 36 arranged as an auger assembly. The crop residues expelled by the axial threshing assembly 22 are fed by means of a beater 40 to a straw chopper 42 which chops and distributes them over the platform width over the field. The mentioned systems are driven by an internal combustion engine and are controlled by an operator from an operator's cab 38. The shown axial threshing assembly 22 with one or more axial threshing and separating rotors is merely an exemplary embodiment and could be replaced by a tangential threshing arrangement with one or more threshing drums and subsequent straw walkers or separation rotors.

Platform:

The platform 18 comprises a reciprocating knife bar 50 extending generally over the entire width of the platform 18. The knife bar 50 can be rigid or flexible, as known in the art. A reel 52 is positioned on the platform 18 and also extends generally over the entire width of the platform 18 (or a part thereof). The outer ends of the reel 52 are supported on arms 54, of which only one is shown in FIG. 1. The arms 54 have rear ends which are supported around axes extending transversely to the forward direction "V" on the frame 56 of the platform 18, which frame 56 also extends over the width of the platform 18, and extend from there towards the front. Each arm 54 is coupled to an actuator 58 in form of a hydraulic cylinder, which is pivotally supported on the frame 56 and on the arm 54. The arms 54 and thus the reel 52 are lifted and lowered by adjusting (retracting and expanding) the actuator 58.

On a central tube 62 that can be set into a rotation motion (during harvest operation, in the counter-clock sense in FIG. 1) by a controllable drive 110, tine carriers 64 are supported, extending also over the width of the platform 18 (or a part thereof), on which tine carriers 64 fingers 66 are mounted. A second actuator 68 in form of a hydraulic cylinder is adapted for a horizontal adjustment of the reel 52 by moving a support bearing of the tube 62 along the arm 54. The platform 18 also comprises a transverse conveyor 112, which can be arranged as an auger (as shown) or conveyor belts, in order to feed the crop cut by the knife bar 50 to the center of the platform 18 and to feed it into the feederhouse 20 through a rear opening in the frame 56.

The height of the platform 18 over ground is defined by a third actuator 70, controlled by means of the electronic control unit 46 based upon input from the user input device 44 and/or an automatic control, the electronic control unit 46 adapting the platform height to the ground contour, keeping the platform 18 at the desired height over ground or guiding it with a desired pressure on the ground, which pivots the feederhouse 20 and thus the platform 18, which is removably mounted thereon, around a horizontal axis 72 extending transversely to the forward direction with respect to the chassis 12 of the harvesting machine 10. As known in the art, the platform 18 can pivot around a horizontal, forwardly extending axis (lateral tilt) to follow the ground contour, normally moved by another actuator (not shown) controlled by the electronic control unit 46.

Platform Operation:

In the state of the art, the height adjustment of the reel 52 is performed by an operator, who is provided with a user input device 44 with keys in his cab 38. The user input device 44 is connected to an electronic control unit 46 which on its end controls the actuator 58. If the operator depresses an upper key of the user input device 44, the reel 52 is lifted, while it is lowered, as long as the operator depresses a lower key of the user input device 44. While harvesting standing crop 76, the operator will position the reel 52 in the horizontal direction (by means of additional keys of the user input device 44, which control the second actuator 58 via the electronic control unit 46) with a small space in front of the knife bar 50 of the platform 18.

The vertical height of the reel 52 is adjusted by an operator normally in a manner such that the fingers 66 of the reel 52 engage into the stalks of the standing crop 76 somewhat below the ears. If the reel 52 is adjusted too high, crop 76 can collected on the knife bar 50. At correct reel height, the knife bar 50 can cut the crop 76 without problems and the plant stalks fall with the ears in front to the transverse conveyor 112. The forward position of the reel 52 depends on the respective yield, i.e. the reel 52 is moved at high throughputs further to the front and vice versa. When harvesting downed crop, the reel 52 needs to be vertically and in difficult conditions also horizontally closer to the knife bar 50 in order to feed the plants into the direction of the knife bar 50 and subsequently to the transverse conveyor 112. In the case that downed crop needs only to be harvested over a part of the width of the platform 18, while standing crop comes in over the remaining width, a very low reel position results in poor crop flow and to losses in the standing grain. In this case, an intermediate position is used in order to harvest both the downed crop as also the standing stalks in a reasonable fashion.

The horizontal position of the knife bar 50 with respect to the frame 56 of the platform 18 is adjustable by an actuator 102, which is controlled via the user input device 44 and the electronic control unit 46. Possible embodiments of a platform with a moveable knife bar are shown in EP 2 803 257 A1 and WO 03/049532 A1, the contents of which incorporated herein by reference. This adjustment allows to adjust the cutting table length to the particular crop type and, if appropriate, to the direction of downed crop.

In the embodiment shown in FIGS. 1 and 2, the platform 18 can be moved by an additional actuator 98 (controlled via the user input device 44 and the electronic control unit 46) around a horizontal axis 100 extending transversely to the forward direction V, which can be coincident with the lower feederhouse roller.

It is thus obvious that the continuous manual adaption of the reel position and/or cutting table length to the actual crop conditions is a task fatiguing the operator, which can at the latest after some hours not more been performed in an optimal manner, resulting in non-optimal harvesting results.

Also, prior art systems for controlling the reel position and/or cutting height (i.e. the vertical position of the header 18, its lateral inclination and forward inclination) based on predictively determined crop height sensed by a first sensor mounted on board of the harvesting machine 10 require a second (feedback) sensor providing signals which also depend on the actual position of the actuators influencing the reel or platform position and on mechanical measurements of the platform 18, which need to be input to a control system and thus are not always accurate.

Figure 3:
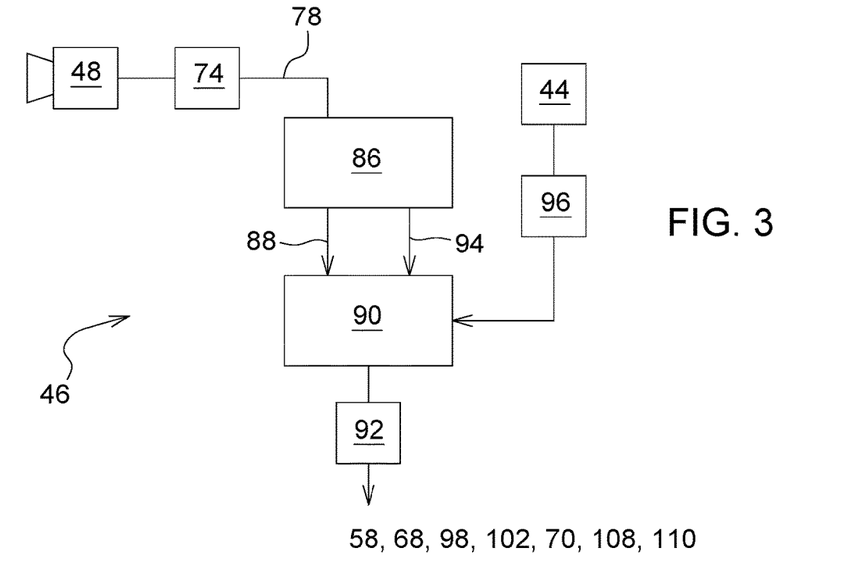
FIG. 3 is a schematic diagram of the system controlling work parameters of the platform operation of the harvesting machine of FIGS. 1 and 2.

Automatic Reel Adjustment:

In order to make work for the operator easier and to relieve him or her from the continuous adjustment of the position of the reel 52, the harvesting machine 10 is provided with a system for an automatic adjustment of operating parameters of the reel 52, shown schematically in FIG. 3. The system comprises a sensor 48 arranged as one or two or more monocular or stereo camera(s) with an image processing system 74. According to FIG. 2, two stereo cameras 48 with lenses arranged side-by-side or one above the other are mounted on the forward edge of the roof of cab 38 and looking to the left and right side, respectively, to watch the entire width of the platform 18 and the field in front of it. The cameras 48 thus view onto the standing (or possibly downed) population of the crop 76 in front of the platform 18. The images from both cameras 48 can be stitched together in the center. The image processing system 74 pre-analyses the image signals of the camera 48 and outputs during operation signals 78 containing information on the height of the upper surface of the crop 76 over ground.

Additionally, the rotational speed of the reel 52 defined by the controllable drive 110 can be controlled manually or automatically based upon among others the signal from the camera(s) 48.

The signals of the sensor 48 are submitted to a signal processing unit 86 which is a part of the electronic control unit 46 and calculates the height of the top surface of the crop 76 over ground based upon the signals 78 of the sensor 48 and submits this height as a first output signal 88 to an electronic processing unit 90. The signal processing unit 86 can comprise a low-pass filter in order to reduce the noise in the output signal 88. This signal 88 is used for controlling reel position and optionally speed in a manner such that the position and speed of the reel 52 are set to appropriate values when the reel 52 interacts with the crop 76 at the position at which the sensor 48 has produced the signal 88. Here, the ground contour can be included in the control algorithm to consider the influence of not-flat ground in the forward and/or in the lateral direction for reel and also for header height control, i.e. by estimating the shape of the ground profile in the area in front of the machine, or loading it from a prior map, estimating the instantaneous 3D transformation between the reference frame of the harvester and a reference frame representing the ground, which enables the expression of the crop position relative to the fixed ground reference frame, as opposed to the dynamic vehicle reference frame, and controlling the position of the reel relative to the ground reference frame, as opposed to the vehicle reference frame, as generally described in EP 0 845 198 A1, EP 0 970 595 A1, U.S. Pat. No. 6,615,570 B2, WO 2008/088916 A2 and EP 2 959 318 A1.

The electronic processing unit 90 also receives a second output signal 94 from the signal processing unit 86 representing the actual position of the reel 52 (i.e. a particular reference point of the reel 52, which can be for example the lower end of a finger 66 which is actually in its most forward position, like the finger 66 in FIG. 1 or the axis of central tube 62). This second output signal 94 is evaluated based upon the image signal provided by the camera 48 and makes use of markers 114 mounted on the central tube 62 of the reel 52 to determine the reel position by extracting data regarding the position of the markers 114 from the image signal 78 provided by the camera 48. The markers 114 can have a suitable color normally not found in the image of the camera 48, like for example blue, and/or be reflective. Alternatively or additionally, the position of the reel 52 can be directly identified in the image data.

The second output signal 94 is replacing or augmenting the feedback sensors known in the art (cf. in particular U.S. patent application 62/535043 of 20 Jul. 2017, the contents of which incorporated herein by reference) for detecting the actual reel position.

The output signals 88 and 94 are fed to the electronic processing unit 90, which also receives the signals from the operator input unit 44 via a signal shaper 96 and provides, via a control unit 92, control signals to actuators 58 and 68. The camera 48 thus simultaneously makes up a first sensing arrangement for sensing a property (crop height) of the field in front of the platform header and a second sensing arrangement for providing a signal suited to derive a value of an adjustable work parameter (vertical and horizontal position of the reference point of the reel 52) of the platform header and controls an actuator 58, 68 for adjusting the work parameter, whereby the electronic processing unit 90 of the electronic control unit 46 is determining a control signal for the actuator 58, 68 based on the signal from the first sensing arrangement and on the signal from the second sensing arrangement. The second sensing arrangement is supported on the harvesting machine 10 and arranged to detect the work parameter in a contact-less manner. The electronic processing unit 90 of the electronic control unit 46 is adapted to determine a nominal work parameter for the actuator 58, 68 (i.e. suitable vertical and horizontal position of the reference point of the reel 52 for the actual crop height) based upon the signal from the first sensing arrangement and to determine the control signal in a manner to minimize the difference between the nominal work parameter and an actual work parameter (i.e. sensed vertical and horizontal position of the reference point of the reel 52) derived from the signal of the second sensing arrangement. Since both sensing arrangements are fixed with respect to each other, a complicated and error-prone coordinate transformation is not required.

The electronic control unit 46 can use the local coordinate system of the harvesting machine 10 as its reference system, i.e. use a suitable point of the harvesting machine 10 (for example, the location of camera 48) or the center of the front edge of the cab roof or on the header 18 as a reference point for determining all other locations and directions of locations of sensed and/or controlled values (like a point of the crop canopy or of the reel). It would also be possible that the electronic control unit references all positions necessary for automatic header control (latitude, longitude, and if required elevation, roll, pitch and yaw) in a global (earth-referenced) coordinate system, by using a position determination receiver (not shown) on the harvesting machine 10. This can be particularly useful if some field properties are determined before the harvesting operation has started or reached a particular position on the field, for example using a drone.

According to a preferred embodiment, the signals received from the operator input unit 44 are only used for overriding actuator settings which are adjusted automatically based on signals from sensor 48.

Details on how the reel position and table length (influenced by actuator 102) and table forward inclination (actuator 98) can be adjusted based upon crop height and possibly detected downed crop are disclosed in U.S. patent application 62/535043 dated 20 Jul. 2017, the contents of which being thus incorporated herein by reference.

Closed Loop Control for Reel Carry-Over:

It should be noted that the signals of camera 48 can also be used to detect possible carry-over of straw stalks by the reel 52. This can be in particular done in the parts of the camera image showing the central tube 62 of the reel 52, since this central tube 62 is normally black and thus possible straw or other crop particles can be easily seen once they appear in front of the central tube 62. In case that the reel 52 carries crop over, the reel 52 can be automatically lifted by the control unit 46.

Header Height Control:

Additional markers 116 above the forward end of side walls of the header 18 can be used for detecting the actual forward position of the knife bar 50 (adjusted by actuator 102) and for detecting the table forward angle (adjusted by actuator 98) by means of the camera 48, the image processing system 74 and the signal processing unit 86, as described above with reference to the markers 114.

The height of the header 18 and optionally its lateral inclination can also be controlled by the electronic control unit 46. The image signal of the camera 48 is used to determine the actual crop height (or the ground contour) and to determine, based upon markers 116, the height of the platform 18. The actuator 70 (and optionally another actuator adjusting the lateral header inclination) is controlled to move a reference point of the platform 18 into a desired height beneath the crop tips or above ground, as described above for the reel control. Actuator 98 can be used to hold the platform 18 parallel to the ground.

Camera Image Processing Details:

In the following, some possible embodiments regarding sensing the reel and/or header position are discussed.

1) Stereo Sensing with a marker.

A system using one or more markers 114 and/or 116 and one or more stereo cameras 48 can work in several manners:

a) The marker 114 and/or 116 can be identified in both left and right images, and a feature-based stereo approach can be used to reconstruct the marker's location in 3D, relative to either the left or the right lenses of the stereo camera 48.

b) Stereo reconstruction can be performed over a larger area of the image, generating a dense grid of 3D reconstructed points. The marker 114 and/or 116 is detected on one of the stereo images, and the locations of the 3D points in the area of the image corresponding to the marker are aggregated into a unique 3D location for the marker relative to either the left of the right lenses of the stereo camera.

Once the location of a marker 114 and/or 116 relative to the stereo camera 48 is estimated, the pre-calibrated, known 3D transform between the sensor and the vehicle reference frame is used to map the marker location in a vehicle reference frame. In this vehicle reference frame, the position of the marker 114 and/or 116 (and hence the reel 52 and/or the header 18) in the fore-aft and height directions can be easily extracted. Having multiple markers 114 and/or 116 can improve the robustness of the system, by allowing it to work even when one of the markers 114 and/or 116 is not detectable due to occlusions, lighting conditions, dust or other reasons.

2) Stereo sensing with reel model

Another approach would be stereo sensing with a reel model. The approach used in this case is similar to the one described previously, but the requirement that one or more markers 114 and/or 116 are attached to the reel 52 or to the header 18 is removed. Instead, one can assume that an approximate 3D model of the reel 52 and/or header 18 is available, either from a CAD model or from a previous 3D scan of the reel and/or header. One can refer to this pre-existing 3D model as a "3D reel template". During system operation, the dense point cloud obtained from the stereo camera 48 can be matched to the 3D reel template, and the best alignment of the two results in an estimate of the position of the object described by the 3D template (in our case the reel 52 or header 18) in the 3D point cloud. It should be mentioned that the reel model does not have to be a full CAD model. One could also describe the reel structure in a simpler fashion, for example by describing that it generally consists from a thicker central cylinder mostly parallel to the ground, surrounded by thinner bars (the reel bats) with perpendicular "fingers". It is expected that the computational effort required to locate the reel in a 3D point cloud with a 3D model instead of leveraging markers is significantly higher.

3) Monocular camera with marker

Another approach would be to use a monocular camera 48 with marker(s) 114 and/or 116. An attractive alternative to using one or more stereo cameras to estimate the reel position directly is to attempt to do so by using one or more monocular cameras, not in a stereo configuration. The key observation is that depending on the camera mounting position and orientation, the 2D physical motion of the center of the reel in a plane perpendicular to the reel length can be reflected by the motion pattern of the reel (or a point on the reel such as a marker) in the 2D image plane of the monocular camera. If this mapping from the physical motion space (i.e. reel fore-aft and reel up-down motion) to the motion of a marker on the reel is lossless (i.e. it can be approximated by a one-to-one mapping), then the mapping can be used in reverse, such that an image coordinates location of the marker can be related to a physical position of the reel relative to the vehicle. There are several methods for modeling this 2D-to-2D mapping, some of which are described below. The input data used for deriving the mappings is assumed to include a set of synchronized pairs of image locations of a marker (image row, image column) and physical space locations of the reel (height and fore-aft in a vehicle frame), obtained for example by installing string potentiometers on the reel, or using optical trackers seen from the side of the reel.

a) LUT-based (LUT=Look-Up-Table)

In this case, the mapping between the physical reel motion and the image coordinates is captured as a simple LUT. Once generated, the LUT can be used during system operation by searching for the current image coordinates of the reel marker, and looking up the corresponding physical position of the reel in the same row of the LUT.

b) Learning-based regression (e.g. Neural Net, Decision Tree, etc.)

In this case, the mapping can be captured by training a machine learning based regression algorithm, starting from input data similar to the LUT described above. The advantage of the learning based regression system is that based on the implementation details, it might be resulting in a smaller memory footprint than the LUT approach.

c) Homography-based

It can be shown that mathematically, the relationship between the physical motion in 2D of a marker attached to the reel and the corresponding 2D coordinates of the marker in the 2D image plane can be described by a homography, as long as the non-linear distortion of the image is negligible, or the images are undistorted prior to processing. In this case, one can use a simple linear model to estimate the mapping between the physical motion of the reel and the motion of the marker in the image space.

4) Monocular camera with reel model: identifying mechanical elements of the reel Instead of using a marker mounted on the reel, one can potentially also use an image processing approach (e.g. template matching, or other standard image recognition techniques) to identify a particular mechanical element of the reel, for example a bat of the reel.

Another approach based on monocular images and a reel model consists in finding the best alignment between a known 3D model and the image (i.e. finding the 3D transform between the 3D model and the vehicle frame, which results in the best alignment with the captured image).

5) Other sensor with 3D capability (ladar, radar, time-of-flight camera, etc.)

Instead of using a 3D stereo camera to generate a 3D point cloud which includes the reel (in order to align it with a 3D model of the reel), it is possible to also use a 3D laser scanner, a high-resolution 3D radar, a time-of-flight (TOF) camera, structured light or any other 3D sensing device which can generate a 3D point cloud including measurements on the reel.

6) Laser/radar with 2D slice capability

A 2D laser range finder or a 2D radar with high resolution could also be used to scan the reel in a plane that crosses the linear structure of the reel. As a result, one could process the range data from the 2D laser or radar (by template matching or other techniques) in order to estimate the location of the reel in the 2D scan. Assuming that the laser range finder or the radar is mounted in a known position on the vehicle (just like it was for the 3D stereo camera), it is possible to map the extracted location of the reel in the 2D scan to a reel position expressed with respect to the OVEHICLE reference frame attached to the vehicle.

7) Non-imaging solutions

Contactless sensors like ultrasonic range meters mounted to sense the distance directly between the reel and the machine frame or cab could replace the string pots/sensors inside the actuators use in the art. This approach would work more easily for headers with a split-reel design, since the contactless sensor can interact with to the central reel holding mechanism.

Modifications:

It should be noted that a number of modifications to the described embodiment can be made. The harvesting machine 10 can be, instead of a combine, a self-propelled or pulled windrower or forage harvester. The sensor 48 needs not to look (only) to the front of the harvesting machine 10, but could additionally look to the side of the harvesting machine 10 and collect the described data already during harvesting a pass over the field adjacent the sensed area. It would also be possible to mount the sensor 48 on a drone or UAV and let it fly over the field before harvest, and to have a second sensor 48 on the harvesting machine 10 for detecting (only or additionally to the field properties) the actual reel and/or header position. In these embodiments, it is useful to reference the signals of the first sensing arrangement, made up by the sensor on the harvesting machine or on the UAV, in a global reference system. They can be converted into the local reference system of the harvesting machine 10 for controlling the actuator 58, 68, 98, 102, 70 in the manner described above, or the signals of the camera 48 providing the feedback value of the second sensing arrangement are converted into the global reference system.

Instead of a monocular or stereo camera, the camera 48 can be any sort of 3D sensor such as a laser, radar or a time-of-flight camera, as mentioned above.

The present disclosure has several technical advancements, including but not limited to the realization of: (1) a simple mechanism to cater mounting of implement of wide variety of widths to a tractor; and (2) an implement mounting arrangement which easily operable by an operator from the seat of a tractor.

While the foregoing specification has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure which comes within known or customary practice in the art to which this disclosure pertains.

What is claimed is:

1. A system for controlling an operative parameter of a harvesting header of an agricultural harvesting machine, comprising:
    a first sensing arrangement configured to sense a property of a field in front of the header in a contact-less manner,
    a second sensing arrangement configured to provide a signal suited to derive a value of an adjustable work parameter of the header,
    an actuator configured to adjust the work parameter, and
    a control unit configured to determine a control signal for the actuator based on a signal from the first sensing arrangement and on the signal from the second sensing arrangement,
    wherein the second sensing arrangement is arranged to detect the position of a reference point, which indicates the work parameter, in a contact-less manner, and the first sensing arrangement and the second sensing arrangement are relatively fixed and comprise a jointly used sensor, which is a single camera sensor that makes up the first and the second sensing arrangements.

2. The system of claim 1, wherein the first and second sensing arrangements are mounted on the header or on the harvesting machine.

3. The system of claim 1, wherein the control unit is operable to store and process the signals of the first sensing arrangement and the second sensing arrangement in a local reference system of the header or of the harvesting machine or in an earth-referenced coordinate system.

4. The system of claim 1, wherein the control unit is adapted to determine a nominal work parameter for the actuator based upon the signal from the first sensing arrangement and to determine the control signal in a manner to minimize the difference between the nominal work parameter and an actual work parameter derived from the signal of the second sensing arrangement.

5. The system of claim 1, wherein the work parameter adjusted by the actuator and sensed by the second sensing arrangement is at least one of header height over ground, lateral header angle, forward header angle, vertical position of a reel and horizontal position of a reel.

6. The system of claim 1, wherein the second sensing arrangement comprises an image processing system, adapted to sense markings mounted to an element of the header that is moveable by the actuator.

7. The system of claim 1, wherein the property of the field detected by the first sensing arrangement is at least one of a height of crop and a ground contour.

8. An agricultural harvesting machine comprising a chassis, a ground engaging apparatus supporting the chassis on the ground, a feederhouse for adapting a harvesting header on the chassis, and a system for controlling an operative parameter of the harvesting header of the agricultural harvesting machine, comprising:
    a first sensing arrangement configured to sense a property of a field in front of the header in a contact-less manner,
    a second sensing arrangement configured to provide a signal suited to derive a value of an adjustable work parameter of the header,
    an actuator configured to adjust the work parameter, a control unit configured to determine a control signal for the actuator based on the signal from the first sensing arrangement and on a signal from the second sensing arrangement, wherein the second sensing arrangement is arranged to detect the position of a reference point, which indicates the work parameter, in a contact-less manner, and the first sensing arrangement and the second sensing arrangement are relatively fixed and comprises a jointly used sensor, which is a single camera sensor that makes up the first and the second sensing arrangements, and an image processing system that pre-analyses image signals from the single camera sensor, wherein the image processing system provides signals to a processing unit that creates two output signals for the control unit to process.

9. The agricultural harvesting machine according to claim 8, wherein the harvesting machine is one of a combine, a forage harvester and a windrower.

10. The system of claim 1, further comprises an image processing system that pre-analyses image signals from the single camera sensor.

11. The system of claim 10, wherein the image processing system provides signals to a processing unit that creates two output signals for the control unit to process.

* * * * *